(12) United States Patent
Snapp

(10) Patent No.: US 8,160,542 B2
(45) Date of Patent: Apr. 17, 2012

(54) SYSTEM AND METHOD FOR HANDLING SPECIAL NUMBER CALLS USING TEXT MESSAGE FORMAT

(75) Inventor: John Lawrence Snapp, Westminster, CO (US)

(73) Assignee: West Corporation, Omaha, NE (US)

(*) Notice: Subject to any disclaimer, the term of this patent is extended or adjusted under 35 U.S.C. 154(b) by 435 days.

(21) Appl. No.: 12/534,239

(22) Filed: Aug. 3, 2009

(65) Prior Publication Data

US 2011/0028159 A1    Feb. 3, 2011

(51) Int. Cl.
*H04M 11/04* (2006.01)
(52) U.S. Cl. .......... 455/404.2; 455/404.1; 455/461; 455/464; 455/456.1; 455/456.2; 455/456.3; 455/457; 340/988; 340/989; 340/990; 340/991; 340/992
(58) Field of Classification Search .... 455/404.1–404.2, 455/461–464, 456.1–457, 440; 340/988–992, 340/426.19–426.3; 701/207, 213–215
See application file for complete search history.

(56) References Cited

U.S. PATENT DOCUMENTS

| 5,636,245 A | 6/1997 | Ernst et al. |
| 6,522,250 B1 | 2/2003 | Ernst et al. |

*Primary Examiner* — Kamran Afshar
*Assistant Examiner* — Manpreet Matharu

(57) ABSTRACT

A system for reducing location-related messages in a mobile a network includes: (a) a mobile communicator; (b) a location server coupled with the mobile communicator and the mobile a network; and (c) a location determiner coupled with the mobile communicator or the location server. The location determiner occasionally collects location information relating to an extant location of the mobile communicator. The mobile communicator or the location determiner effects location-related messages to convey location information to the location server. The mobile communicator or the location server employs the location-related messages to compile a locations schedule for the mobile communicator in a time-location almanac coupled with the mobile communicator. The mobile communicator occasionally compares the extant location with the locations schedule. Neither of the mobile communicator and the location determiner effects the location-related messages when the extant location is within a predetermined variance from the locations schedule.

20 Claims, 5 Drawing Sheets

US 8,160,542 B2

SYSTEM AND METHOD FOR HANDLING SPECIAL NUMBER CALLS USING TEXT MESSAGE FORMAT

FIELD OF THE INVENTION

The present invention is directed to mobile telecommunication systems, and especially to managing location information in mobile telecommunication systems.

BACKGROUND OF THE INVENTION

Mobile communication units operating in mobile telecommunication networks are sometimes empowered to ascertain their own location using one or more of a variety of location technologies. Location technologies employed by mobile communication units may include, by way of example and not by way of limitation, determination of a sector of a cellular system within which the mobile communication unit is operating; Global Positioning System (GPS) locating, latitude-longitude parameters (usually derived from another locating technology) and other locating technologies.

A mobile communication unit may periodically report its position to its host network via a wireless transmission that may involve several messages in the manner of notification messages and acknowledgement messages, with repeated messages in the event that a message is not clearly received.

In today's environment in which wireless bandwidth is a premium resource carefully husbanded by operators, designers and users of wireless devices, it is important to limit the amount of wireless message traffic occurring in a network as much as possible while maintaining network communications integrity.

There is a need for a system and method for reducing location-related messages in a mobile communications network.

SUMMARY OF THE INVENTION

A system for reducing location-related messages in a mobile a network includes: (a) a mobile communicator; (b) a location server coupled with the mobile communicator and the mobile a network; and (c) a location determiner coupled with the mobile communicator or the location server. The location determiner occasionally collects location information relating to an extant location of the mobile communicator. The mobile communicator or the location determiner effects location-related messages to convey location information to the location server. The mobile communicator or the location server employs the location-related messages to compile a locations schedule for the mobile communicator in a time-location almanac coupled with the mobile communicator. The mobile communicator occasionally compares the extant location with the locations schedule. Neither of the mobile communicator and the location determiner effects the location-related messages when the extant location is within a predetermined variance from the locations schedule.

A method for managing location information in a mobile communications network includes: (a) in no particular order: (1) providing a mobile communication unit; (2) providing at least one location server unit coupled with the mobile communication unit and coupled with the mobile communications network; and (3) providing a location determining unit coupled with at least one of the mobile communication unit and the at least one location server unit; (b) operating the location determining unit to occasionally collect location information relating to an extant location of the mobile communication unit; (c) operating at least one of the mobile communication unit, the location determining unit and the location server unit to employ the location information to compile a locations schedule for the mobile communication unit in a time-location almanac coupled with the mobile communication unit; (d) operating the mobile communication unit to occasionally compare the extant location with the locations schedule; (e) operating at least one of the mobile communication unit and the location determining unit to determine whether the extant location is outside a predetermined variance from the locations schedule; and (f) if the extant location is outside a predetermined variance from the locations schedule, operating at least one of the mobile communication unit and the location determining unit to effect a location-related communication to convey the location information to the location server unit.

It is, therefore a feature of the present invention to provide a system and method for reducing location-related messages in a mobile communications network.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
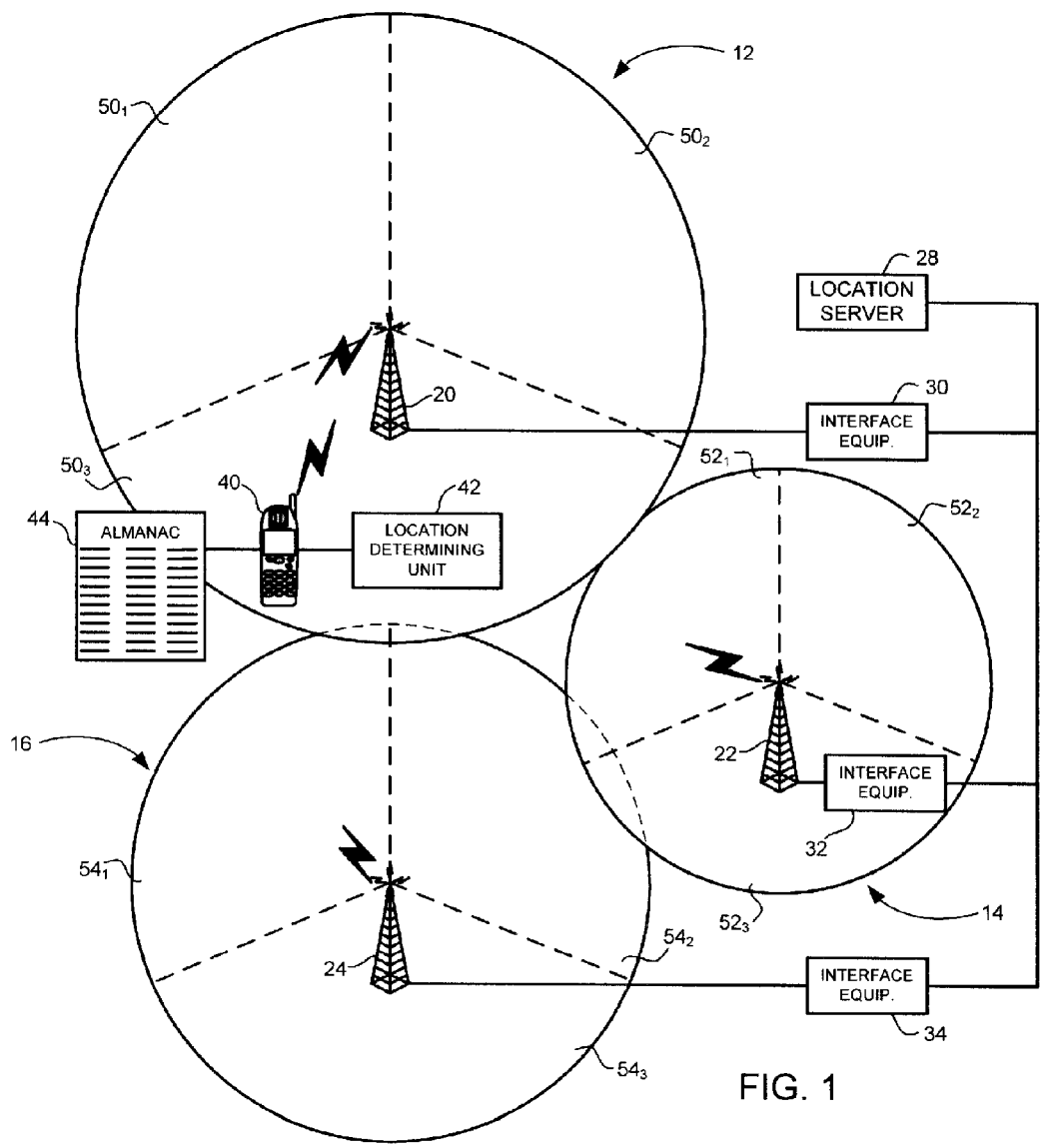
FIG. 1 is a schematic diagram illustrating a system for reducing location-related message traffic among a plurality of wireless communication networks.

FIG. 1 is a schematic diagram illustrating a system for reducing location-related message traffic among a plurality of wireless communication networks. In FIG. 1, a mobile communications system 10 includes mobile communication networks 12, 14, 16. Three mobile communication networks 12, 14, 16 are illustrated as included in mobile communication system 10 in FIG. 1 as an example. Any number of mobile communication networks may be included in a mobile communication system.

Each mobile communication network 12, 14, 16 includes a mobile communication tower so that mobile communication network 12 includes a mobile communication tower 20, mobile communication network 14 includes a mobile communication tower 22 and mobile communication network 16 includes a mobile communication tower 24. Each mobile communication tower 20, 22, 24 operates in a substantially discrete operating area, sometimes referred to as a cell, so that mobile communication tower 20 operates in an operating area 21, mobile communication tower 22 operates in an operating area 23, mobile communication tower 24 operates in an operating area 25.

Each operating area 21, 23, 25 includes substantially discrete sectors, sometimes referred to as cell sectors. Thus, operating area 21 includes sectors $50_1$, $50_2$, $50_3$; operating area 23 includes sectors $52_1$, $52_2$, $52_3$; operating area 25 includes sectors $4_1$, $54_2$, $54_3$. Three sectors are illustrated as included in each operating area 21, 23, 25 in FIG. 1 as an example. Any number of sectors may be included in a respective operating area 21, 23, 25.

Mobile communications system 10 also includes a location server or location server unit 28. Location server 28 is coupled with mobile communication networks 12, 14, 16 via respective interface equipment (described in greater detail in connection with FIG. 2). Thus, location server 28 is coupled with mobile communication network 12 via interface equipment 30, location server 28 is coupled with mobile communication network 14 via interface equipment 32 and location server 28 is coupled with mobile communication network 16 via interface equipment 34.

A mobile communication unit 40 may roamingly operate in mobile communication system 10 through mobile communication networks 12, 14, 16. Mobile communication unit 40 may be embodied in any mobile unit capable of communicating with mobile communication system 10 including, by way of example and not by way of limitation, a cellular phone, a personal communication system, a personal digital system, a smart phone or another unit capable of effecting mobile communication within mobile communication system 10.

Mobile communication unit 40 has a location determining unit 42 coupled with mobile communication unit 40. Location determining unit 42 may be integrally included within mobile communication unit 40. Location determining unit 42 may ascertain location of mobile communication unit 40 using one or more of a plurality of location determining technologies including, by way of example and not by way of limitation, determination of cell sector in which mobile communication unit 40 is operating, Global Positioning System (GPS) technology, satellite navigation, or another location determining technology. Location may be expressed by location determining unit 42 in terms of GPS coordinates, latitude-longitude coordinates or another location designation system.

One or both of mobile communication unit 40 and location determining unit 42 may participate in communicating location information relating to a then-extant location for mobile communication unit 40 to location server 28. Reporting of an extant location for mobile communication unit 40 may be effected occasionally or periodically according to a schedule. Location server 28 collects a plurality of extant location reports received from mobile communication unit 40 and provides a compilation of location information based upon the collected extant location reports to mobile communication unit 40 in the form of a locations schedule relating to the historical positions reported by mobile communication unit 40. The locations schedule is stored in mobile communication unit 40 in a time-location almanac 44. Almanac 44 may contain information relating to where mobile communication unit 40 is expected to be at predetermined times of day, times of week or according to another time schedule.

For purposes of this description, the term "almanac" shall mean a collection of once-extant locations embodied in one or more location expressions, each respective once-extant location being identifiable as having been extant at a particular time.

In prior art mobile communication systems 10, mobile communication unit 40 may periodically communicate with location server 28 (or with a unit of interface equipment 30, 32, 34; not shown in detail in FIG. 1) to report extant location information relating to mobile communication unit 40. Using the present invention, once a time-location almanac is provided to mobile communication unit 40 there is no further automatic periodic reporting of extant location information provided by mobile communication unit 40. Instead, mobile communication unit 40 receives extant location informant from location determining unit 42 and compares that extant location information with a location indicated in almanac 44. If the extant location provided by location determining unit 42 is within a predetermined variance of an appropriate location for the time recorded within almanac 44, mobile communication unit 40 will forego reporting extant location to location server 28. If a predetermined variance from an appropriate location for the time recorded within almanac 44 is exceeded, then mobile communication unit 40 may report extant location to location server 28. Alternatively, reporting extant location to location sever 28 may not be made until a predetermined consecutive extant locations vary from appropriate entries in almanac 28.

Foregoing location reporting by mobile communication unit 40 advantageously reduces traffic load in mobile communication network 12, making bandwidth available for other communications within mobile communication network 12.

When a predetermined number of excessive variances between an extant location and a scheduled location stored in almanac 44 occur, location server 28 may update or replace almanac 44.

An alternate embodiment may provide that mobile communication unit 40 and location determining unit 42 cooperate to create almanac 44 without involving location server 28. In such an embodiment, location reporting traffic may be further reduced in mobile communication system 10. In such an alternate embodiment, excessive variances may be reported to location server 28, location determining unit 42 may effect updating or replacing almanac 44 and almanac 44 may be provided to location server 28 occasionally or periodically according to a schedule.

Location server 28 or location determining unit 42 may construct a new almanac 44 when mobile communication unit 40 roams to another mobile communication network such as mobile communication network 14 or mobile communication network 16.

Figure 2:
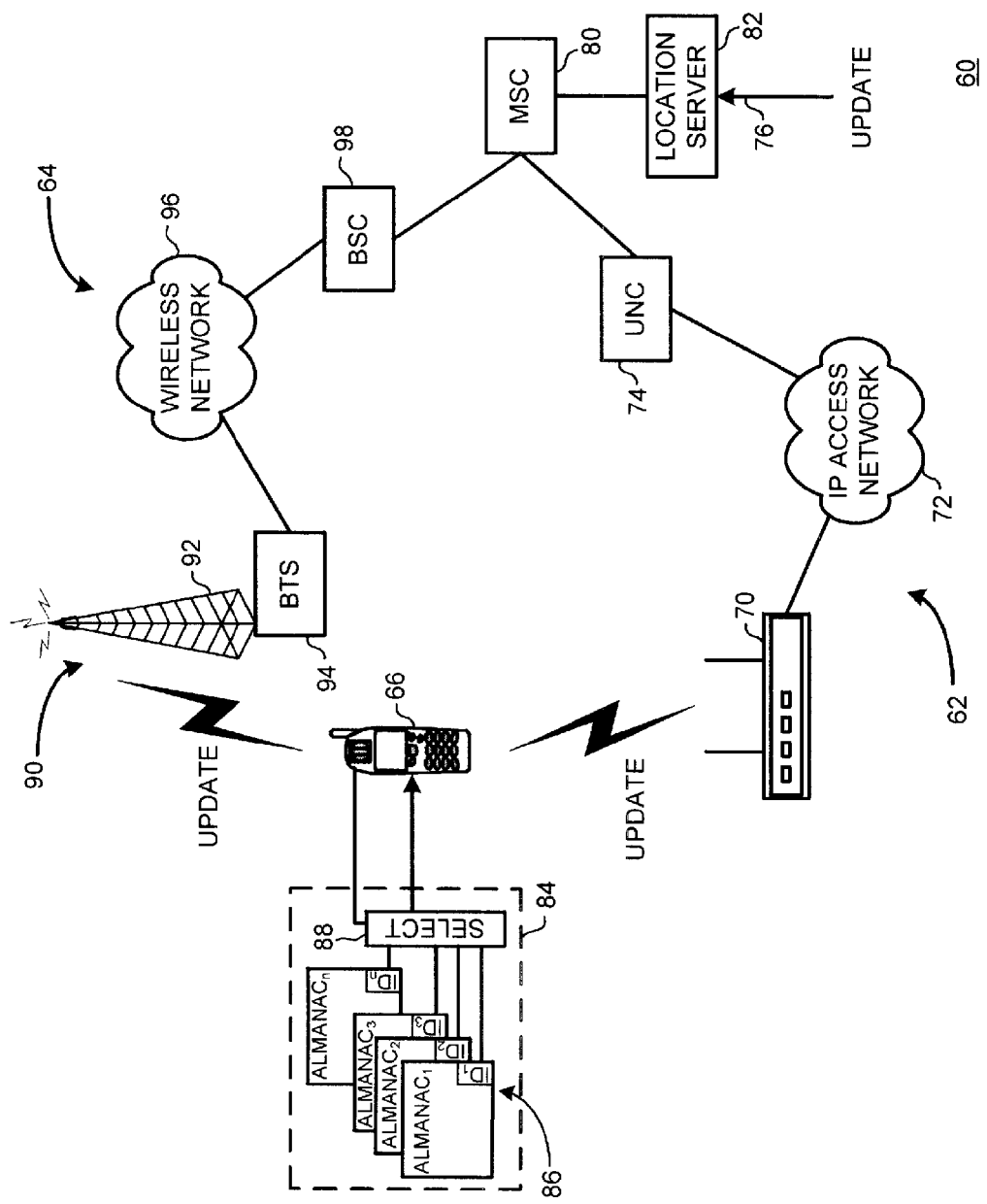
FIG. 2 is a schematic diagram illustrating a system for reducing location-related message traffic among wireless networks employing a plurality of wireless communication technologies.

FIG. 2 is a schematic diagram illustrating a system for reducing location-related message traffic among wireless networks employing a plurality of wireless communication technologies. In FIG. 2, a telecommunication system 60 includes an Unlicensed Mobile Access (UMA) Network (UMAN) 62 and a Radio Access Network (RAN) 64. UMAN 62 may be embodied in, by way of example and not by way of limitation, a Wi-Fi network, a Bluetooth network or another type of UMA. RAN 64 may be embodied in, by way of example and not by way of limitation, a cellular network or a Personal Communication System (PCS) network employing any of several communication protocols including, by way of further example and not by way of limitation, GSM or another protocol using Time Division Multiple Access (TDMA), Code Division Multiple Access (CDMA) or another coding scheme. UMAN 62 and RAN 64 are configured for wireless communication with a mobile communication unit 66. Mobile communication unit 66 may be embodied in a wireless calling device including, by way of example and not by way of limitation, mobile telephone, Personal Digital Assistant (PDA) devices, "Smart" phones, automatic crash notification (CAN) units, mobile radio devices and similar communication devices.

UMAN 62 includes an access unit 70 coupled with an Internet Protocol (IP) access network 72. Access unit 70 facilitates communication between mobile communication unit 66 and IP network 72. IP network 72 is coupled with a UMA Network Controller (UNC) 74. UNC 74 is coupled with a Mobile Switching Center (MSC) 80. MSC 30 is also coupled with a location server 86.

RAN 64 includes an access unit 90 that includes a radio antenna embodied in a radio tower 92 and a Base Transceiver Station (BTS) 94 coupled with radio tower 92. BTS 94 is coupled with a private network 96. Private network 96 may be embodied in, by way of example and not by way of limitation, a cellular network or a PCS network employing any of several communication protocols including, by way of further example and not by way of limitation, GSM or another protocol using Time Division Multiple Access (TDMA), Code Division Multiple Access (CDMA) or another coding scheme. Access unit 90 facilitates communication between wireless communicating unit 66 and private network 96. Private network 96 is coupled with a Base Station Controller (BSC) 98. BSC 98 is coupled with MSC 80.

Calling unit 66 may wirelessly access UMAN 62 to place a call via access unit 70 to establish communication via IP network 72, UNC 74, MSC 80 and other networks coupled with MSC 80 (not shown in FIG. 2).

Calling unit 66 may instead wirelessly access RAN 64 to place a call via BTS 94 to establish communication via private wireless network 96, BSC 98 and MSC 80 and other networks coupled with MSC 80 (not shown in FIG. 2).

Calling unit 66 includes in a storage unit 84 a plurality of almanacs $ALMANAC_1$, $ALMANAC_2$, $ALMANAC_3$, $ALMANAC_n$. The indicator "n" is employed to signify that there can be any number of almanacs stored storage unit 84. The inclusion of four almanacs $ALMANAC_1$, $ALMANAC_2$, $ALMANAC_3$, $ALMANAC_n$ in FIG. 2 is illustrative only and does not constitute any limitation regarding the number of almanacs that may be stored in storage unit 84. Throughout this description, use of a reference numeral using a generic subscript herein may be taken to mean that any respective member of the plurality of elements having the same reference numeral may be regarded as included in the description. Thus, by way of example and not by way of limitation, referring to $ALMANAC_n$ in describing FIG. 2 may be taken to mean that any almanac—$ALMANAC_1$, $ALMANAC_2$, $ALMANAC_3$ or $ALMANAC_n$ (FIG. 2)—may be regarded as capable of employment as described.

Each respective almanac $ALMANAC_n$ may be stored in storage unit 84 in relation with a unique identifier $ID_n$. In such a storing arrangement, almanac $ALMANAC_1$ is stored with a unique identifier $ID_1$, $ALMANAC_2$ is stored with a unique identifier $ID_2$, $ALMANAC_3$ is stored with a unique identifier $ID_3$ and $ALMANAC_n$ is stored with a unique identifier $ID_n$.

Having such a capability for storing more than one almanac, mobile calling unit 66 may store a time-location almanac for each of several mobile communication networks 12, 14, 16 that may be include in a mobile communication system 10 (as described in FIG. 1).

Certain capabilities as are described in this disclosure may be offered by a service provider as a subscription service. By way of example and not by way of limitation, a communication system may provide Emergency Alert System (EAS) services to subscribed users that could send information to a mobile communication unit or trigger an event based upon the location of the mobile communication unit.

In one embodiment of the invention, a subscriber using mobile communication unit 66 may subscribe with a central server such as, by way of example and not by way of limitation, location server 82. Location server 82 may assign a pseudo number or pseudo account to the subscriber for purposes of location. In such an embodiment of the invention, only mobile communication unit 66 may know the true subscriber identity, and location server 82 will only know mobile calling unit 66 by the pseudo number. Mobile communication unit 66 may issue temporary keys to applications that will allow the applications to query the database containing an almanac associated with mobile communication unit 66 (when the almanac is stored in location server 82, for example). The temporary key may be a one-use key, a time-limited key or another form of controlled key. The temporary key may be unique for an application and would not reveal the identity of the subscriber. Such a "hidden identity" feature may be particularly useful in protecting privacy of a subscriber in connection with certain applications.

Updating subscriber information may be effected by a calling service provider, by a subscription service provider not associated with a calling service provider or by another arrangement. Updating information stored in storage unit 84 may be carried out locally by a service connected directly with calling instrument 66 or may be carried out remotely via a communication link such as, by way of example and not by way of limitation, UMAN 62 or RAN 64. Updating may be effected using one or more various connection configurations such as, by way of example and not by way of limitation, a wireless connection, a cable connection and an infrared connection. An update port 76 may be provided to facilitate updating storage unit 84 via location server 82 and one of UMAN 62 or RAN 64. Updating almanacs $ALMANAC_n$ is discussed further in connection with FIG. 4.

Selection of a respective almanac $ALMANAC_n$ is facilitated by a selecting unit 88. Selecting unit 88 may be incorporated in storage unit 84 (as illustrated in FIG. 2) or may be separate from storage unit 84 (not shown in FIG. 2). Selection unit 88 may employ a unique identifier $ID_n$ for selecting a respective almanac $ALMANAC_n$.

Figure 3:
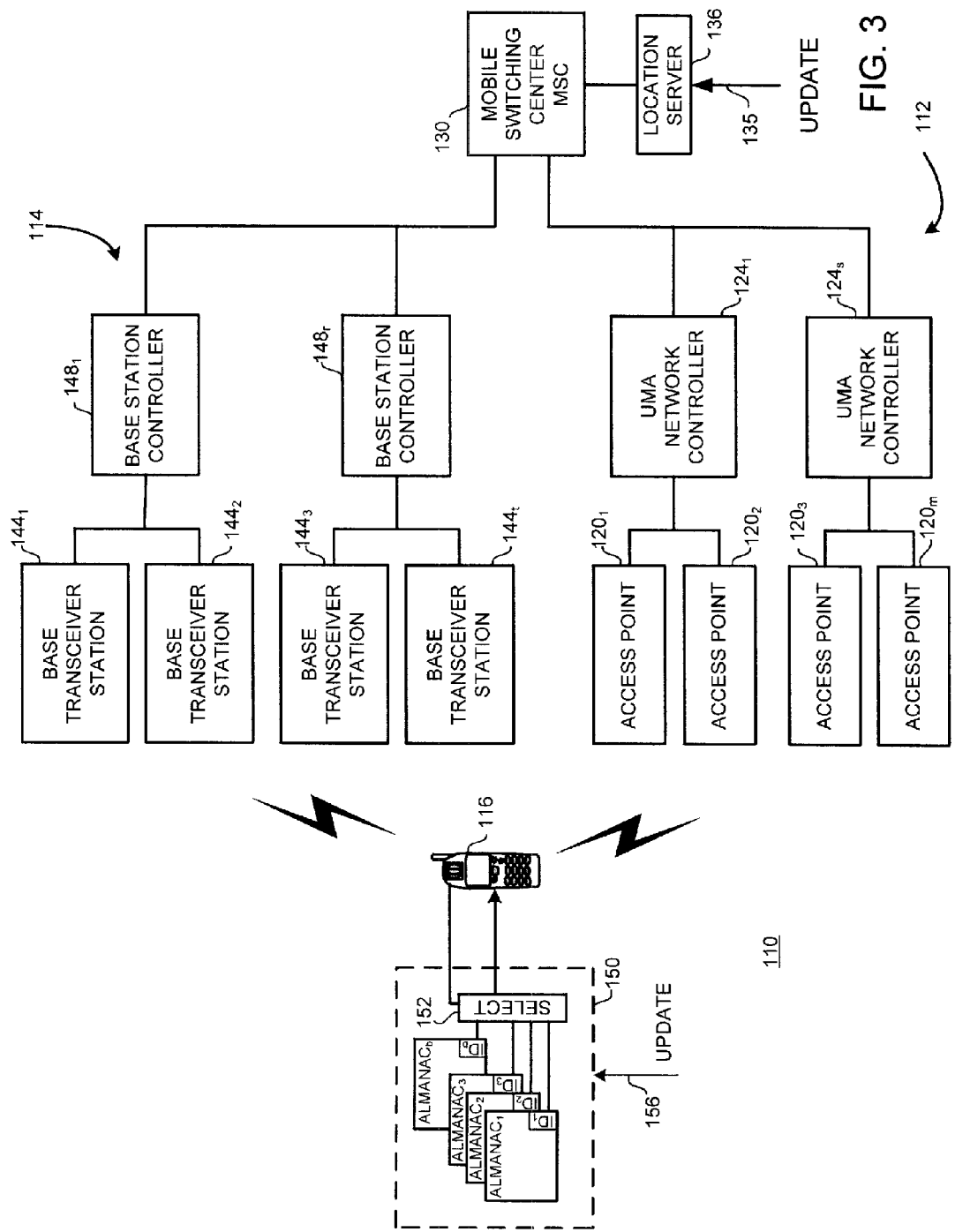
FIG. 3 is a flow diagram illustrating call routing for a system configured according to the teaching of the present invention deployed in a representative multi-network arrangement.

FIG. 3 is a flow diagram illustrating call routing for a system configured according to the teaching of the present invention deployed in a representative multi-network arrangement. In FIG. 3, a telecommunication system 110 includes an Unlicensed Mobile Access (UMA) Network (UMAN) 112 and a Radio Access Network (RAN) 114. UMAN 112 may include, by way of example and not by way of limitation, a Wi-Fi network, a Bluetooth network or another type of UMA. RAN 114 may include, by way of example and not by way of limitation, a cellular network or a Personal Communication System (PCS) network employing any of several communication protocols including, by way of further example and not by way of limitation, GSM or another protocol using Time Division Multiple Access (TDMA), Code Division Multiple Access (CDMA) or another coding scheme. UMAN 112 and RAN 114 are configured for wireless communication with a wireless calling unit mobile communication unit 116.

UMAN 112 includes access units $120_1$, $120_2$, $120_3$, $120_m$ coupled for call routing via an Internet Protocol (IP) network (not shown in FIG. 3; see IP network 72, FIG. 2). The indicator "m" is employed to signify that there can be any number of access units in telecommunication system 110. The inclusion of four access units $120_1$, $120_2$, $120_3$, $120_m$ in FIG. 3 is illustrative only and does not constitute any limitation regarding the number of access units that may be included in a telecommunication system employing the present invention.

Access units $120_1$, $120_2$, $120_3$, $120_m$ facilitate communication with a wireless communicating unit 116. Calls from access units $120_1$, $120_2$ may be placed with a UMA Network Controller (UNC) $124_1$. Calls from access units $120_3$, $120_m$ may be placed with a UMA Network Controller (UNC) $124_s$. The indicator "s" is employed to signify that there can be any number of UNCs in telecommunication system 110. The inclusion of two UNCs $124_1$, $124_s$ in FIG. 2 is illustrative only and does not constitute any limitation regarding the number of UNCs that may be included in a telecommunication system employing the present invention. UNCs $124_1$, $124_s$ are coupled with a Mobile Switching Center (MSC) 130. MSC 130 is coupled with a location server 136.

RAN 114 includes access units represented in FIG. 3 by Base Transceiver Stations (BTS) $144_1$, $144_2$, $144_3$, $144_t$. The indicator "t" is employed to signify that there can be any number of BTSs in telecommunication system 110. The inclusion of four BTSs $144_1$, $144_2$, $144_3$, $144_t$ in FIG. 2 is illustrative only and does not constitute any limitation regarding the number of BTSs that may be included in a telecommunication system employing the present invention.

BTSs $144_1$, $144_2$, $144_3$, $144_t$ are coupled for call routing with MCS 130 via a private network (not shown in FIG. 3; see private network 96, FIG. 2). BTSs $144_1$, $144_2$, $144_3$, $144_t$ facilitate communication with wireless communicating unit 116. BTSs $144_1$, $144_2$, $144_3$, $144_t$ are coupled with a Base Station Controllers (BSC) $148_1$, $148_r$. Calls from BTSs $144_1$, $144_2$ may be placed with BSC $148_1$. Calls from BTSs $144_3$, $144_t$ may be placed with a BSC $148_r$. The indicator "r" is employed to signify that there can be any number of BSCs in telecommunication system 110. The inclusion of two BSCs $148_1$, $148_r$ in FIG. 3 is illustrative only and does not constitute any limitation regarding the number of BSCs that may be included in a telecommunication system employing the present invention. BSCs $148_1$, $148_r$ are coupled with MSC 130.

Calling unit 116 may wirelessly access UMAN 112 to place a call via an access unit $120_1$, $120_2$, $120_3$, $120_m$ to establish communication via a UNC $124_1$, $124_s$ and MSC 130 to another network (not shown in FIG. 3).

Calling unit 116 may instead wirelessly access RAN 114 to place a call via a BTS $144_1$, $144_2$, $144_3$, $144_t$ to establish communication with PSAP 134 via a BSC $148_1$, $148_r$ and MSC 130 to another network (not shown in FIG. 3).

Calling unit 116 includes in a storage unit 150 a plurality of almanacs $ALMANAC_1$, $ALMANAC_2$, $ALMANAC_3$, $ALMANAC_b$. The indicator "b" is employed to signify that there can be any number of almanacs stored in storage unit 150. The inclusion of four almanacs $ALMANAC_1$, $ALMANAC_2$, $ALMANAC_3$, $ALMANAC_b$ in FIG. 3 is illustrative only and does not constitute any limitation regarding the number of almanacs that may be stored in storage unit 150.

Each respective almanac $ALMANAC_b$ may be stored in storage unit 150 in relation with a unique identifier $ID_b$. In such a storing arrangement, almanac $ALMANAC_1$ is stored with a unique identifier $ID_1$, $ALMANAC_2$ is stored with a unique identifier $ID_2$, $ALMANAC_3$ is stored with a unique identifier $ID_3$ and $ALMANAC_b$ is stored with a unique identifier $ID_b$.

Having such a capability for storing more than one almanac, mobile calling unit 116 may store a time-location almanac for each of several mobile communication networks 12, 14, 16 that may be include in a mobile communication system 10 (as described in FIG. 1).

Certain capabilities as are described in this disclosure may be offered by a service provider as a subscription service. By way of example and not by way of limitation, a communication system may provide Emergency Alert System (EAS) services to subscribed users that could send information to a mobile communication unit or trigger an event based upon the location of the mobile communication unit.

Updating information stored in storage unit 150 may be carried out locally by a service connected directly with calling instrument 116 or may be carried out remotely via a communicate link such as, by way of example and not by way of limitation, UMAN 112 or RAN 114. Updating may be effected using one or more various connection configurations such as, by way of example and not by way of limitation, a wireless connection, a cable connection and an infrared connection. An update port 156 may be provided to facilitate updating storage unit 150. An update port 135 may be provided to facilitate updating storage unit 150 via location server 136 and one of UMAN 112 or RAN 114.

Selection of a respective almanac $ALMANAC_b$ is facilitated by a selecting unit 152. Selecting unit 152 may be incorporated in storage unit 150 (as illustrated in FIG. 3) or may be separate from storage unit 150 (not shown in FIG. 3). Selection unit 152 may employ a unique identifier $ID_n$ for selecting a respective almanac $ALMANAC_b$.

Figure 4:
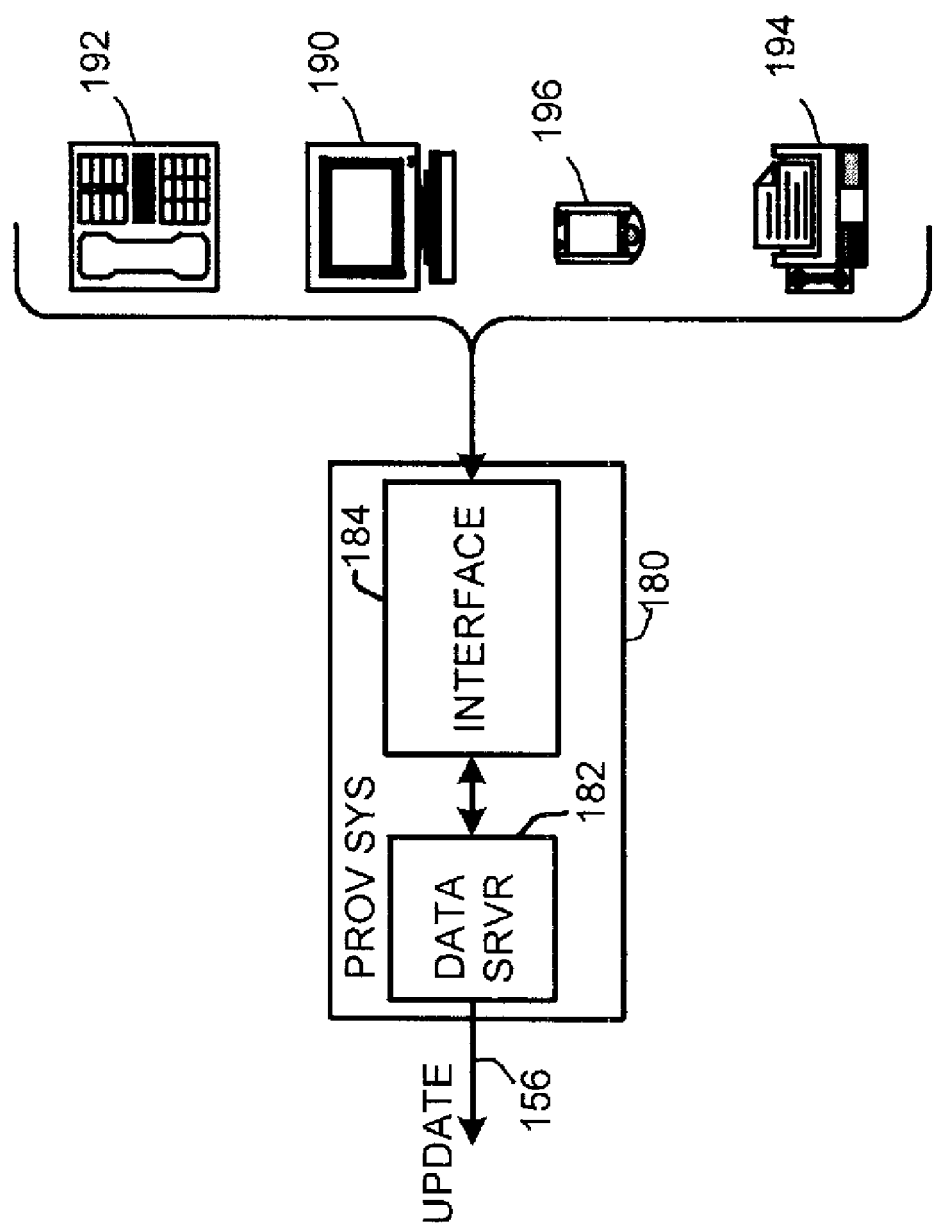
FIG. 4 is a schematic diagram illustrating various ways information relating to a subscriber for a service offering features of the present invention may be updated.

FIG. 4 is a schematic diagram illustrating various ways information relating to a subscriber for a service offering features of the present invention may be updated. In FIG. 4, a provisioning system 180 is configured for updating information in storage unit 150 (FIG. 3). Provisioning system 80 includes a data server unit 82 coupled with an interface unit 84.

Provisioning system 80 is coupled with a communications or update port 56 associated with storage unit 150 (FIG. 3). Storage unit 150 may be updated based on preferences set up by a home or business subscriber and submitted to provisioning system 180 via interface unit 184 by any of various technologies known to those skilled in the art of telecommunication system design including, by way of example and not by way of limitation, a computer 190, a phone 192, a facsimile machine 194, a PDA (Personal Digital Assistant) 196 or another communication device such as, by way of example and not by way of limitation, a smart phone (not shown in FIG. 4).

Updating via update port 156 may be effected using one or more various connection configurations such as, by way of example and not by way of limitation, a wireless connection, a cable connection and an infrared connection.

Provisioning system may also be configured for updating storage unit 150 (FIG. 3) via update port 135, or for updating storage system 84 (FIG. 2) via update port 76.

Figure 5:
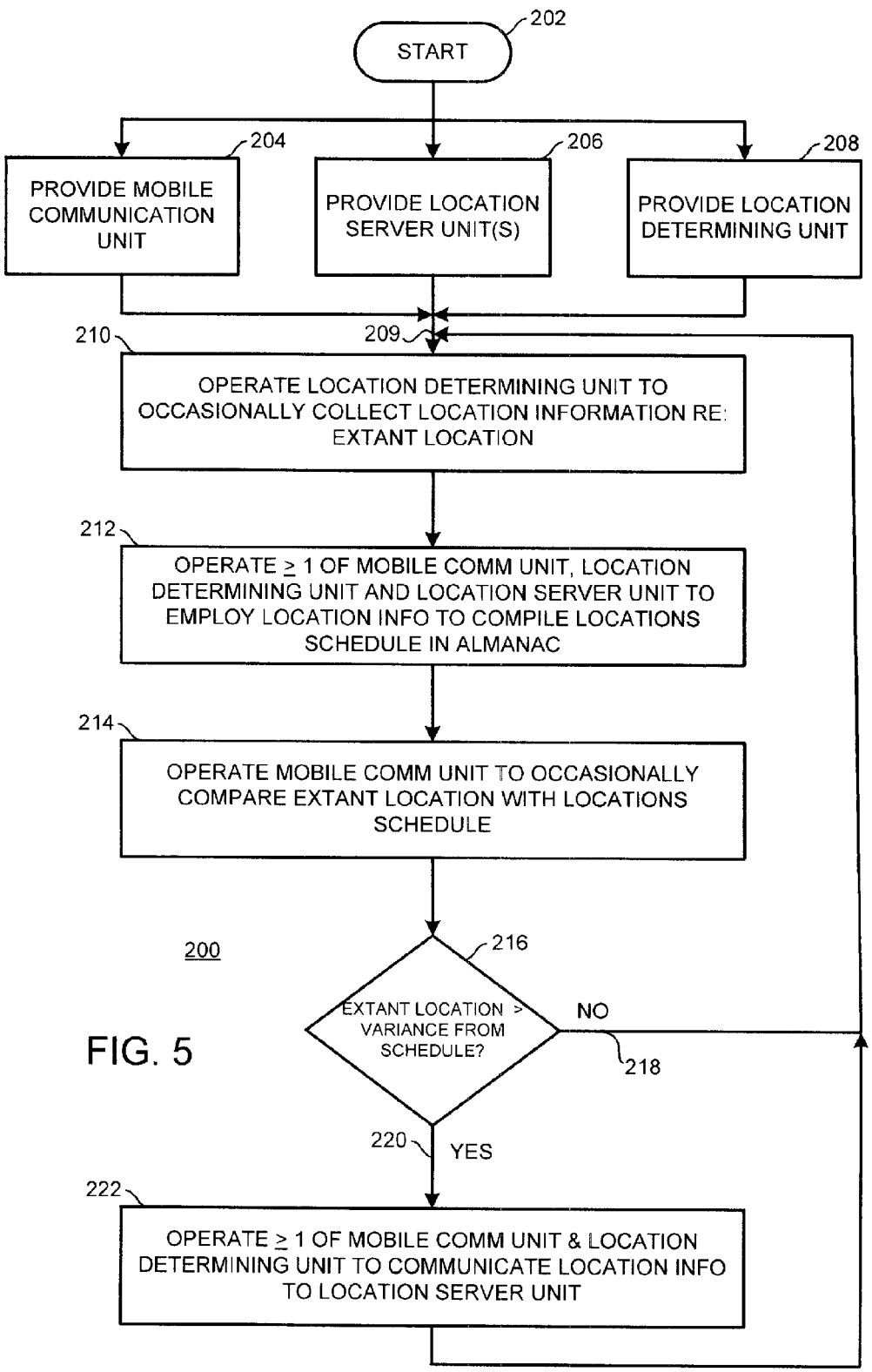
FIG. 5 is a flow chart illustrating the method of the present invention.

FIG. 5 is a flow chart illustrating the method of the present invention. In FIG. 5, a method 200 for managing location information in a mobile communications network begins at a START locus 202.

Method 200 continues with, in no particular order: (1) providing a mobile communication unit, as indicated by a block 204; (2) providing at least one location server unit coupled with the mobile communication unit and coupled with the mobile communications network, as indicated by a block 206; and (3) providing a location determining unit coupled with at least one of the mobile communication unit and the at least one location server unit, as indicated by a block 208.

Method 200 continues with operating the location determining unit to occasionally collect location information relating to an extant location of the mobile communication unit, as indicated by a block 210.

Method 200 continues with operating at least one of the mobile communication unit, the location determining unit and the location server unit to employ the location information to compile a locations schedule for the mobile communication unit in a time-location almanac coupled with the mobile communication unit, as indicated by a block 212.

Method 200 continues with operating the mobile communication unit to occasionally compare the extant location with the locations schedule, as indicated by a block 214.

Method 200 continues to pose a query whether the extant location is outside a predetermined variance from the locations schedule, as indicated by a query block 216. If the extant location is not outside a predetermined variance from the locations schedule, method 200 proceeds from query block 216 via a NO response line 218 to a locus 209, and method 200 proceeds from locus 209 to perform steps represented by blocks 210, 212, 214, 216.

If the extant location is outside a predetermined variance from the locations schedule, method 200 proceeds from query block 216 via a YES response line 220 to a locus 209, and method 200 proceeds from locus 209 to Method 200 continues with operating at least one of the mobile communication unit and the location determining unit to effect a location-related communication to convey the location information to the location server unit, as indicated by a block 222.

Method 200 proceeds from block 222 to locus 209, and method 200 proceeds from locus 209 to perform steps represented by blocks 210, 212, 214, 216.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A system for reducing location-related message traffic in at least one mobile communications network; the system comprising:
    (a) a mobile communication unit;
    (b) at least one location server unit coupled with said mobile communication unit and coupled with said at least one mobile communications network; and
    (c) a location determining unit coupled with at least one of said mobile communication unit and said at least one location server unit; said location determining unit occasionally collecting location information relating to an extant location of said mobile communication unit;
at least one of said mobile communication unit and said location determining unit effecting said location-related message traffic to convey said location information to said location server unit; at least one of said mobile communication unit and said location server unit employing said location-related message traffic to effect compiling a locations schedule for said mobile communication unit in a time-location almanac coupled with said mobile communication unit; said mobile communication unit occasionally comparing said extant location with said locations schedule; neither of said mobile communication unit and said location determining unit effecting said location-related message traffic when said extant location is within a predetermined variance from said locations schedule.

2. The system for reducing location-related message traffic in at least one mobile network as recited in claim 1 wherein said location determining unit is integrally included with said mobile communication unit.

3. The system for reducing location-related message traffic in at least one mobile network as recited in claim 1 wherein said extant location is expressed in terms of cell sector.

4. The system for reducing location-related message traffic in at least one mobile network as recited in claim 1 wherein said extant location is expressed in terms of global positioning system coordinates.

5. The system for reducing location-related message traffic in at least one mobile network as recited in claim 2 wherein said extant location is expressed in terms of cell sector.

6. The system for reducing location-related message traffic in at least one mobile network as recited in claim 2 wherein said extant location is expressed in terms of global positioning system coordinates.

7. A system for managing location information in a mobile communications network; the system comprising:
    (a) a mobile communication unit;
    (b) at least one location server unit coupled with said mobile communication unit and coupled with said mobile communications network; and
    (c) a location determining unit coupled with at least one of said mobile communication unit and said at least one location server unit; said location determining unit occasionally collecting location information relating to an extant location of said mobile communication unit;
at least one of said mobile communication unit and said location determining unit employing said location information to compile a locations schedule for said mobile communication unit in a time-location almanac coupled with said mobile communication unit; said mobile communication unit occasionally comparing said extant location with said locations schedule; at least one of said mobile communication unit and said location determining unit effecting a location-related communication to convey said location information to said location server unit when said extant location is outside a predetermined variance from said locations schedule.

8. The system for managing location information in a mobile communications network as recited in claim 7 wherein said location determining unit is integrally included with said mobile communication unit.

9. The system for managing location information in a mobile communications network as recited in claim 7 wherein said extant location is expressed in terms of cell sector.

10. The system for managing location information in a mobile communications network as recited in claim 7 wherein said extant location is expressed in terms of global positioning system coordinates.

11. The system for managing location information in a mobile communications network as recited in claim 7 wherein said extant location is expressed in terms of global positioning system coordinates.

12. The system for managing location information in a mobile communications network as recited in claim 8 wherein said extant location is expressed in terms of cell sector.

13. The system for managing location information in a mobile communications network as recited in claim 8 wherein said extant location is expressed in terms of global positioning system coordinates.

14. A method for managing location information in a mobile communications network; the method comprising:
 (a) in no particular order:
  (1) providing a mobile communication unit;
  (2) providing at least one location server unit coupled with said mobile communication unit and coupled with said mobile communications network; and
  (3) providing a location determining unit coupled with at least one of said mobile communication unit and said at least one location server unit;
 (b) operating said location determining unit to occasionally collect location information relating to an extant location of said mobile communication unit;
 (c) operating at least one of said mobile communication unit, said location determining unit and said location server unit to employ said location information to compile a locations schedule for said mobile communication unit in a time-location almanac coupled with said mobile communication unit;
 (d) operating said mobile communication unit to occasionally compare said extant location with said locations schedule;
 (e) operating at least one of said mobile communication unit and said location determining unit to determine whether said extant location is outside a predetermined variance from said locations schedule; and
 (f) if said extant location is outside a predetermined variance from said locations schedule, operating at least one of said mobile communication unit and said location determining unit to effect a location-related communication to convey said location information to said location server unit.

15. The method for managing location information in a mobile communications network as recited in claim 14 wherein said location determining unit is integrally included with said mobile communication unit.

16. The method for managing location information in a mobile communications network as recited in claim 14 wherein said extant location is expressed in terms of cell sector.

17. The method for managing location information in a mobile communications network as recited in claim 14 wherein said extant location is expressed in terms of global positioning system coordinates.

18. The method for managing location information in a mobile communications network as recited in claim 15 wherein said extant location is expressed in terms of cell sector.

19. The method for managing location information in a mobile communications network as recited in claim 15 wherein said extant location is expressed in terms of global positioning system coordinates.

20. The method for managing location information in a mobile communications network as recited in claim 15 wherein said extant location is expressed in terms of latitude-longitude coordinates.

\* \* \* \* \*